(12) United States Patent
Haartsen

(10) Patent No.: US 6,973,067 B1
(45) Date of Patent: Dec. 6, 2005

(54) MULTI-MEDIA PROTOCOL FOR SLOT-BASED COMMUNICATION SYSTEMS

(75) Inventor: Jacobus Cornelis Haartsen, Borne (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/348,495

(22) Filed: Jul. 7, 1999

Related U.S. Application Data

(60) Provisional application No. 60/109,692, filed on Nov. 24, 1998.

(51) Int. Cl.[7] .......................... H04B 7/212; H04J 3/00; H04L 12/66
(52) U.S. Cl. ...................... 370/337; 370/347; 370/349; 370/352; 370/442; 370/493
(58) Field of Search ................................ 370/471, 352, 370/356, 355, 337, 347, 468, 346, 348, 349, 370/336, 442, 493

(56) References Cited

U.S. PATENT DOCUMENTS

| | | | | |
|---|---|---|---|---|
| 5,483,524 A | * | 1/1996 | Lev et al. | 370/355 |
| 5,875,184 A | * | 2/1999 | Altvater et al. | 370/330 |
| 6,011,784 A | * | 1/2000 | Brown et al. | 370/329 |
| 6,055,242 A | * | 4/2000 | Doshi et al. | 370/468 |
| 6,393,013 B1 | * | 5/2002 | Masui et al. | 370/346 |

FOREIGN PATENT DOCUMENTS

| | | |
|---|---|---|
| EP | 0584820 | 3/1984 |
| EP | 0495600 A | 7/1992 |
| EP | 0827308 A2 | 3/1998 |

* cited by examiner

Primary Examiner—Ricky Ngo
Assistant Examiner—Soon D. Hyun
(74) Attorney, Agent, or Firm—Potomac Patent Group PLLC

(57) ABSTRACT

A method and apparatus are described establishing multi-media communications on a shared communications channel. A first and a second communication unit, such as a master and slave unit, establish a synchronous communications link. Additional synchronous communications links may be established. A first data packet associated with the synchronous communication link is communicated to the second communication unit by including an address. Time slots reserved for the synchronous channel by the first unit are separated by a fixed time interval. One or more additional communications units may communicate over an asynchronous link established between the master and additional units using remaining time slots. Data packets may be communicated to additional units by including addresses associated with each additional units The synchronous link may be interrupted with the asynchronous link by communicating an asynchronous data packet on a time slot reserved for the synchronous communications link. The asynchronous link may be a Time-Division duplex link for alternately transmitting and receiving on different ones of the remaining time slots. Asynchronous data packets communicated to additional units on remaining time slots. The master unit may poll each additional units for a response packet to the asynchronous data packet. On a Time-Division duplex link, additional units alternately receive the poll from the first communication unit and transmit the response packet on different ones of the remaining time slots.

26 Claims, 4 Drawing Sheets

MULTI-MEDIA PROTOCOL FOR SLOT-BASED COMMUNICATION SYSTEMS

CROSS-REFERENCE TO COPENDING APPLICATIONS

This application claims the benefit of U.S. Provisional Application No. 60/109,692, filed Nov. 24, 1998.

BACKGROUND

The present invention relates to communication systems. In particular the present invention is related to communication systems which use time-slot based protocols and which support both asynchronous data services and synchronous and/or isochronous data services.

The term "Multimedia" generally refers to the integration of data, voice and video services which share common platforms and data channels. Service providers (SPs) around the world continue to develop more advanced systems for delivering a wide array of services on a common channel including Internet data services, telephone services, and television services to a subscriber base. For obvious economic reasons, SPs prefer that all services they provide be carried by a common medium, such medium being, for example, television cable, telephone cable, or air interface in the case of wireless systems. Particularly with new global standards emerging within the wireless communications community that provide for the allocation of physical resources between circuit switched services and, for example, General Packet Radio Services (GPRS) as outlined in "Digital Cellular Telecommunications System (Phase 2+); General Packet Radio Services (GPRS); Overall Description of the GPRS Radio Interface; Stage 2 (GSM 03.64 version 6.0.1 Release 1997" ETSI TS 101 350 V6.0.1 (1998–08), for example, at chapter 6, the need to integrate both types of services on a physical resource or common channel is great.

Problems arise however with the integration and provision of services on the same medium since data associated with different services, such as voice, video, and non-real time (NRT) data transfer, have different characteristics and requirements. Data associated with NRT data transfer, for example, is typically communicated in bursts, and requires a high degree of integrity, leading to bit error probability requirements in the realm of $10^{-12}$ to $10^{-14}$. Variable delay associated with the communication of NRT data however is generally well tolerated. In sharp contrast, live voice and live video data or voice and video on-line playback data, for example, have real-time requirements and may be characterized by constant data streams which, if interrupted or delayed may have severe quality degrading consequences. Individual bit errors in the data stream however may be tolerated but may lead to distortion or minor degradation.

Human beings may normally tolerate certain levels of distortion in an audio or video or combined audiovisual presentation before the distortion causes continued listening or viewing to become annoying or tiresome. In some cases the threshold for distortion tolerance is high, at least for short intervals, with the important factor most likely being the ability to continue to discern information content. Clicks, pops, noise, distortion and related audio anomalies may make audio communication less pleasant and "snow" or other visual anomalies in a video stream may make a video presentation less appealing, but, in most cases of distortion due to bit errors in the data stream of audio and video, the information content is generally preserved. However, since audio and video data streams may be tightly synchronized in time, e.g. relatively highly correlated, particularly with regard to combined audio and video streams, variable delay associated with incoming data packets is not permitted, since delay would cause, for example, talker and listener to become out of synch with each other in a conversation, words to be unintelligible, and the like. Variable delay introduced in a voice stream would be noticeable to the listener since it affects the timing and shape of the acoustical waveform. Likewise, delay introduced in a video stream would cause, for example, variations or interruptions in the speed of motion of the video stream, and, worse for example, a loss of frame synchronization in the receiver. In these cases, information content is seriously compromised.

To avoid delay related anomalies, synchronous services such as voice and video may typically be carried in a communications system over circuit-switched connections. Circuit switched connections may be established in a time-slot environment by reserving a portion of the communication medium exclusively for a particular link between a source and destination. Circuit switching is attractive for links which are constantly in use but may be inefficient for asynchronous data traffic typically transferred in bursts without regard to delay. Asynchronous communications conducted on a circuit switched connection may result in an unnecessarily idle channel during intervals when no data is being transferred, and consequently channel capacity and ultimately system capacity is wasted. This condition may be illustrated by example with reference to a user of Internet services, who during the interval, for example, when waiting for a request to be processed, is receiving no data, or during the interval when data has been delivered and displayed and a user is reviewing the information, is receiving no data. Therefore, data of this kind, (e.g., asynchronous data) is typically carried over packet-switched connections.

It is important to note that in prior art circuit switching, once a circuit is set up for circuit switched communications, it is presumed that all subsequent data packets on the circuit switched connection are destined for the party at the other end of the connection. Thus, in prior art circuit switched connections, addresses are not used.

In the packet switched environment, one or more channels of the medium may be shared among a large number of packet users in a more efficient manner. A packet data source such as an Internet server, for example, may seize the medium or a portion of it when it becomes available and may use it for relatively short duration of time sufficient to send its packet or packets whereupon the medium is released. Other packet data sources may wait until the medium is idle to seize the medium and send their packets. Due to the bursty nature of traffic associated with packet data, packet switching is much more effective and leads to greater efficiency of use of the communications medium.

Packet switching in communications systems may further provide an overall communications channel capacity gain due to the advantages provided by statistical multiplexing. Statistical multiplexing allows existing logical packet-switched channels to seize any free slot space. Packets of different logical channels are concatenated on the same slotted physical channel driven by availability and capacity need. Systems using statistical multiplexing may employ a buffer memory which may temporarily store packet data during periods of peak traffic. Statistical multiplexing minimizes channel waste due to inactive channels. For more information related to statistical multiplexing, see "Data Communications, Computer Networks and Open Systems", Halsall & Fred, Addison Wesley, p160–161, 1995. Non-real time data transfer typically involves the transmission of files, documents, drawings, photo's, still video and other text- or picture-based material Recently, downloading webpages over the Internet has become an important NRT traffic service. NRT data has no strict delivery requirements. The transmission of a file can take seconds or minutes depending on the file size and data speed. Variations in the delivery time are unimportant. In addition, the file can be sent in chunks (or packets), and the delivery of each chunk can be handled separately. The only requirement at the recipient is that finally all chunks have arrived, and that there is means in the recipient to place the chunks in the proper order to reconstruct the original file.

As previously described, integrating synchronous real-time data and asynchronous packet data services on the same medium gives rise to a problem: circuit switching is inefficient for asynchronous packet data services; and packet switching is detrimental for synchronous real-time data services, which cannot tolerate delay.

It would therefore be appreciated in the art for a method and apparatus for combining the delivery of synchronous and asynchronous data on the same medium at the same time such that the medium may continue to support packet-switched connections and circuit-switched connections concurrently.

SUMMARY

It is therefore an object of the present invention to provide a communication system having a communications channel which is capable of supplying both synchronous and asynchronous data within a communications system.

It is a further object of the present invention to provide such a communications channel in a TDMA, CDMA, FDMA, and related wireless communications systems.

In accordance with one aspect of the present invention, the foregoing and other objects are achieved in a method and apparatus involving a communication system where multimedia communications may be established on a shared communications channel using a first and second communication unit, such as a master and slave unit. The master communication unit, for example, may be configured to establish a synchronous communications link with the second, or slave, communication unit, communicating a first data packet on first time slot of a first set of time slots associated with the synchronous communication link to the second communication unit by including the address associated with the second communication unit in the data packet. Moreover, additional synchronous links may be established by reserving addition "sets" of time slots. The terms "sets" herein refers to all of the timeslots associated with a group of timeslots which appear at regular intervals conventionally referred to collectively as a "timeslot". The term timeslot herein refers to a single instance of a slot within the set.

In establishing the synchronous link, the master communication unit may reserve a set of time slots for use by the synchronous link. To effect time division on what is, for example in a cellular system, an otherwise unrestricted channel, the master communications unit may separate each one of the time slots associated with the set by a fixed time interval.

It may be desirable to add one or more additional communications units including the second communications unit to the communication system and accordingly an asynchronous communications link may be established between the master or first communications unit and the one or more additional communications units using one or more of the remaining time slots. Data packets may be communicated on a first of the one or more of the remaining time slots associated with the asynchronous communications link from the first communication unit to the one or more additional communication units by including one or more addresses associated with each of the one or more additional communications units.

In another embodiment of the present invention, the first communication unit may be further configured to interrupt the synchronous communications link with the asynchronous communications link by communicating an asynchronous data packet on a time slot reserved for the synchronous communications link. Further, the asynchronous link may be a Time-Division duplex link where, for example, the master communication unit alternately transmits and receives on different ones of the remaining time slots. Asynchronous data packets may further be communicated from the first communication unit to additional units on remaining time slots. On the Time-Division duplex link, for example, the master or first communication unit may poll each of the one or more additional units for a response packet to the asynchronous data packet. Accordingly, the additional units alternately receive the poll from the first communication unit and transmit the response packet on different ones of the remaining time slots.

BRIEF DESCRIPTION OF THE DRAWINGS

The objects and advantages of the invention will be understood by reading the following detailed description in conjunction with the drawings in which.

DETAILED DESCRIPTION

Figure 1:
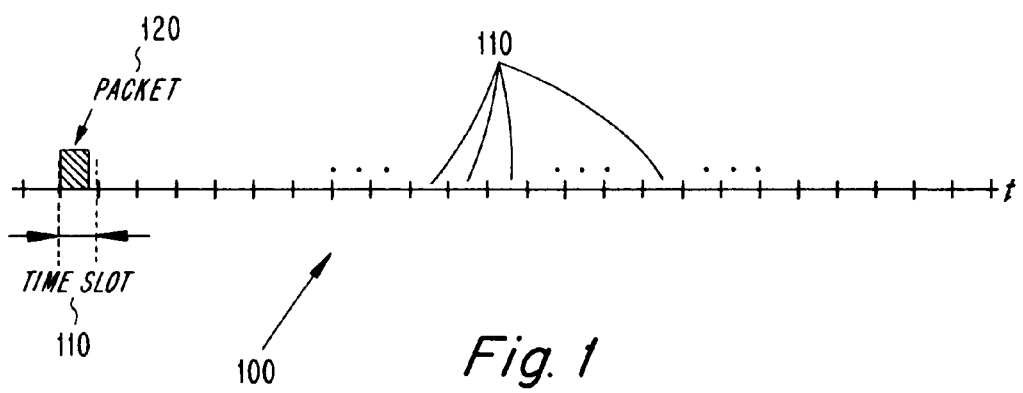
FIG. 1 is a diagram illustrating an exemplary slot-based communication channel.

The various features of the invention will now be described with respect to the figures, in which like parts are identified with the same reference characters.

The present invention provides a flexible communication channel in the context of a wireless communication system using time slots separated by intervals of fixed length. It should be noted that in an embodiment of the present invention, data associated with each time slot, in accordance with the present invention, may be sent using a different frequency. An exemplary system in which such an embodiment could be implemented may be found in a technology known as "Bluetooth" for providing low-cost, robust, efficient, high capacity, ad hoc voice and data connectivity (see, "Bluetooth, the Universal Radio Interface for Ad Hoc wireless connectivity", J. C. Haartsen, Ericsson Review, Telecommunications Technology Journal, No. 3, 1998.)

With reference to the present invention, communications channel 100 carrying synchronous and asynchronous data services may be divided into time slots of equal length in accordance with the present invention as illustrated in FIG. 1 to provide a flexible communications channel. Generally, on each recurrence of time slot 110, data packet 120 may be sent which may further include an address associated with one or more recipients. A circuit-switched connection may be established by reserving time slot 110 at a fixed interval. Time slots not reserved by a circuit-switched connection may be used freely by one or more packet-switched connections which may be set-up and taken down periodically over time, which decision may be taken on a per packet basis. Connected units on a packet switched connection may typically send packets to any other connected units. As mentioned above each of timeslots 110 may be transmitted on a separate frequency in a frequency hopping embodiment, such as may be found within the Bluetooth technology.

Many digital wired and wireless communication systems make use of a slot-based protocol over a physical interface whether it be a fiber optic, wire, air interface, and the like. Accordingly, communications channel 100 may be divided into fixed-length time slots, such as time slot 110 as described; and in time slot 110, data packet 120 may be transmitted as either a part of a synchronous data stream or an asynchronous data packet. In the case of a voice or video data stream on a synchronous channel, data packet 120 may represent one of a stream of data packets and may include voice or video information to be transferred which may first be digitized and then loaded into packets according to, for example, a particular link layer protocol which specifies the packet size, and the like which packets may then be individually transmitted over communications channel 100 in a corresponding time slot 110. In the case of an asynchronous data transfer, a stored data record, for example, a record from an Internet server may be transferred in bursts, depending on traffic, block size, etc until the record is completely transmitted. It is important to note that in accordance with most packet protocols, asynchronous packet data has a much lower tolerance for errors based on the type of data transferred. Thus depending on the error correction, and data acknowledgment protocols certain packets may require retransmission suggesting first that the acknowledge process requires additional time and that packets which are retransmitted may be out of sequence. It will be appreciated by those skilled in the art that out of sequence reception of packets associated with a synchronous real time data stream would be highly disruptive if not fatal to the information content of the stream. However if data associated with a non real time data stream is transferred asynchronously to be played back in a real time mode off line, such data may be transferred on an asynchronous link as described.

Figure 2A:
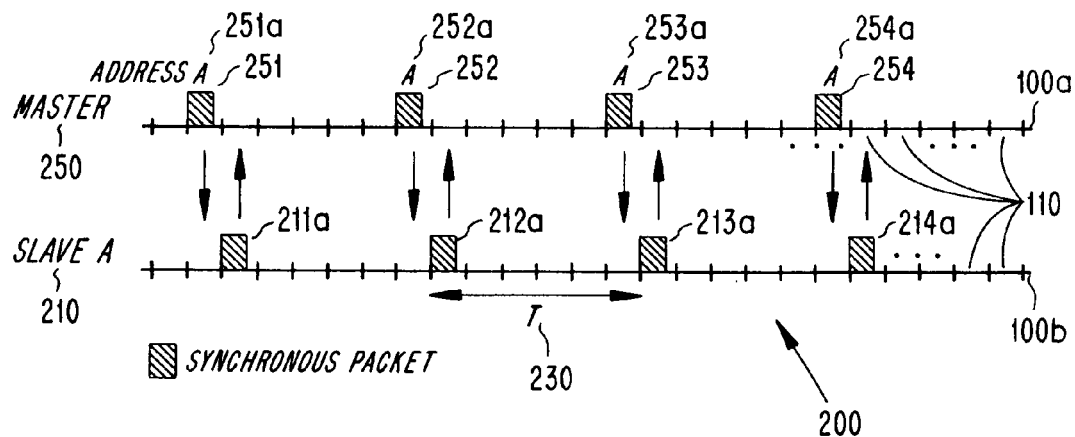
FIG. 2A is a diagram illustrating an exemplary circuit-switched connection over a slot-based channel in accordance with the present invention.

As described, data packet 120 may be associated with a synchronous data stream like that associated, for example, with a voice connection. Data may be transmitted continuously throughout the duration of the connection even during silent intervals. Therefore, the capacity of communications channel 100 is usually much larger than what is required for the synchronous connection. Accordingly, only a certain number of time slots 110 need be used to sustain a synchronous link on communications channel 100. Referring now to FIG. 2A, where an exemplary circuit switched connection between master 250 and Slave A 210 is shown having six repeating time slots, although more or less could be used, only one out of six time slots 110 is used for a single synchronous link on communication channel portions 100a and 100b. It should be noted that communication channel portions 100a and 100b are portions of a single communications channel 100. It may be further appreciated that in, for example, a frameless protocol, a link may be established using one or more time slots. Several individual time slots, often referred to collectively as a "time slot" in a framed protocol, may be established by separating such individual time slots by a fixed time interval, such as fixed time interval T 230. A synchronous two way data stream, such as a voice conversation, may be compressed into packets 251–254 from master 250 and packets 211a–214a from slave A 210 each of which are sent at regular times separated by fixed time interval T 230.

The reservation of a particular one of time slots 110 for establishing a link for synchronous information can be accomplished in different ways. In case of a communication system with decentralized control, the reservation of a time slot 110 may be accomplished by agreement of all units on communication link 100 involved. In a more conventional manner not illustrated, units wanting to establish a synchronous link, for example, may broadcast the reservation to all participants on communications channel 100. In the exemplary decentralized case, reservations are established on a first come first served basis and each unit knows exactly which time slot is reserved for the synchronous link. Accordingly, since new units accessing communication channel 100 will not know of previously existing slot reservations, a problem may arise. Based on the reservation of, for example, one or more time slots 110 for one or more synchronous links, units on communications channel 100 may be cognizant of which of time slots 110 are left for other services such as asynchronous packet data links. In a conventional reservation based system, data packets sent on the synchronous links need not carry an address or identity of the recipient since, for example, time slots 110 are exclusively allocated to the recipient. However, in accordance with an embodiment of the present invention, centralized control is used. Master 250 may be a unit connected to communications channel 100 over, for example, link portion 100a, while all other participants such as slave A 210 are designated as slaves.

Master 250 controls the traffic over communications channel 100 by, for example, scheduling transmission on the synchronous links established over one of time slots 110 separated by fixed interval T 230 as described. In the case of centralized control, packet address A 251a–A 254a may be required to be included when sent from master 250, since otherwise, in the absence of a reservation system where all participants know which of time slots 110 are allocated, a recipient such as slave A 210 cannot associate a particular time slot 110 with a particular slave. Centralized control may be advantageous in that master 250 need only agree with a single slave, such as slave A 210 about which time slot 110 the synchronous link will be established upon. Moreover, general agreement between participants on communication channel 100 is not needed and no broadcasting is required. If address A 251a–A 254a in packets 251–254, for example, do not match the address of slave A 250, slave A 250 is not interested whether packets 251–254 concern a synchronous connection or an asynchronous connection. It will be appreciated that in addition to the foregoing advantages, the synchronous link established on communications channel 100 between master 250 and slave A 210 may be interrupted at any time by sending an asynchronous data packet with address of slave A in the time slot intended for the synchronous link. Master 250 may further interrupt communications with any slave to communicate with any other slave unit. Such an interrupt capability may provide for enhanced services, or may allow asynchronous communications to occur as a "background" process between master 250 and slave A 210 over the established synchronous link or to any other slave on communications channel 100.

As previously described, asynchronous data, for example Internet data traffic may have a bursty character. On time slots 110 not used for establishing synchronous links, asynchronous links may be set up on communications channel 100 for the exchange of asynchronous data. For a more conventional communication system using decentralized control not shown, some kind of listen-before-talk (e.g. collision avoidance) must be used to avoid multiple units seizing communication channel 100 simultaneously. In accordance with another embodiment of the present invention, centralized control may be used with master 250 assuring that no collisions take place. Such centralized control may be accomplished, for example, using a Time-Division duplex scheme where master 250 alternatively transmits and receives. A more thorough description of the use of master and slave units in a communication system using centralized control may be found in U.S. patent application Ser. No. 09/210,594 by J. C. Haartsen et al, entitled "CENTRAL MULTIPLE ACCESS CONTROL FOR FREQUENCY HOPPING RADIO NETWORKS", filed Dec. 15, 1998 and incorporated herein by reference.

Figure 2B:
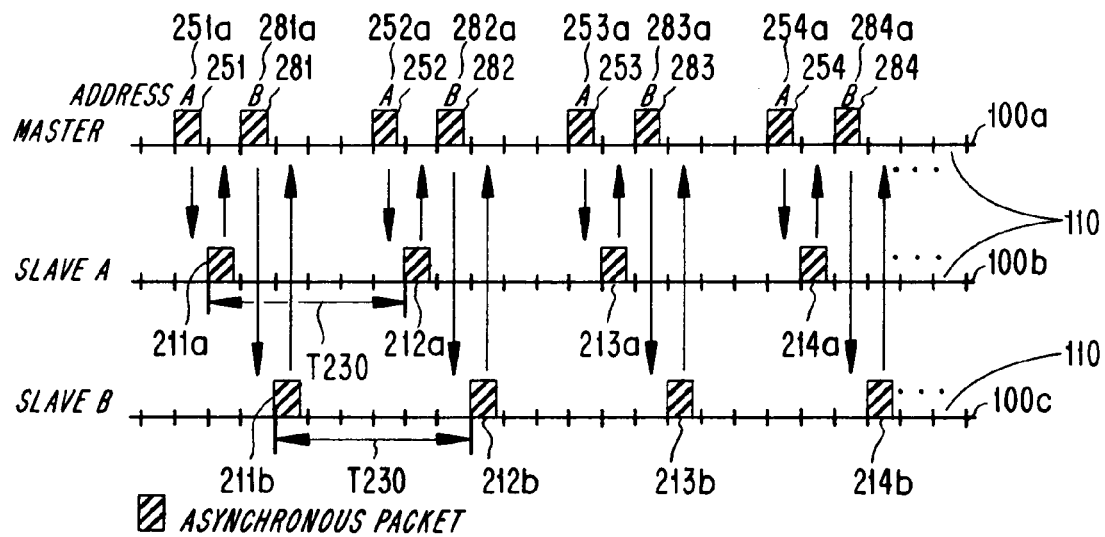
FIG. 2B is a diagram illustrating an additional exemplary circuit-switched connection over a slot-based channel in accordance with the present invention.

It is important to note that additional circuit-switched connections may be established in the manner described, as illustrated in FIG. 2B. Master 250 may reserve additional time slots 110 to establish a second synchronous link with, for example, slave B 310. In a manner similar to establishing a synchronous link with Slave A 210, data packets 281–284 may be communicated to Slave B 310 using addresses 281*a*–284*a*. In response, Slave B 310 may respond alternately with data packets 211*b*–214*b*. Preferably, as illustrated, additional synchronous links use the same slot interval T 230 in order to avoid interference. If the interval T 230 is not chosen identical on all links, then periodically, time slots in the sets of two or more links coincide. However, since this interference happens in a determined manner and can be predicted, appropriate countermeasures can be taken by the master and/or the slave to prevent distortion of the synchronous information. Each additional synchronous link is staggered by an even number of time slots to allow for the return link. Additional time slots 110 not used for synchronous links may be used for asynchronous links as described in greater detail hereinafter. In addition, any synchronous links may be interrupted in the manner previously described.

Figure 2C:
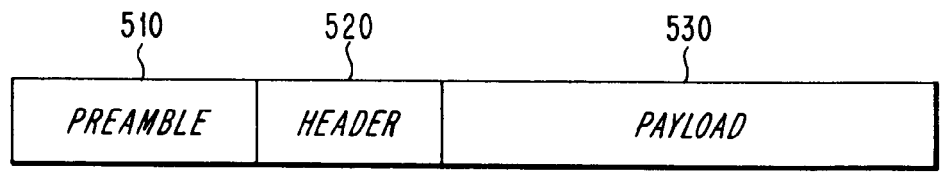
FIG. 2C is a diagram illustrating an exemplary packet in accordance with the present invention.

It should be noted that with reference to "addresses", in an exemplary embodiment of the present invention, packets used on the synchronous and asynchronous links may all have the same appearance, an example of which is shown in FIG. 2C. Packet 540 may be assembled using, for example, three elements: preamble 510, header 520, and payload 530. Preamble 510 may be used by a recipient for timing synchronization and frequency or DC compensation and may also include an identification label identifying the channel, for example, communication channel 100. Packet header 520 may include supervisory control information and may further include a slave address. It is important to note that although, for example, addresses B 251*a* and B 252*a* associated with packets 251 and 252 are described using different reference numerals, addresses B 251*a* and address B 252*a* may more appropriately refer to the individual packet header portions of the corresponding packets and preferably contain the same address. Hereinafter, the address portion of the individual packet header and the "address" of the destination will be used interchangeably and though separately designated, will preferably be the same value for each different slave unit. Payload 530, carries user information or data which can be real-time as in the case of an exemplary synchronous link, or non-real time as in the case of an exemplary asynchronous link.

Figure 3:
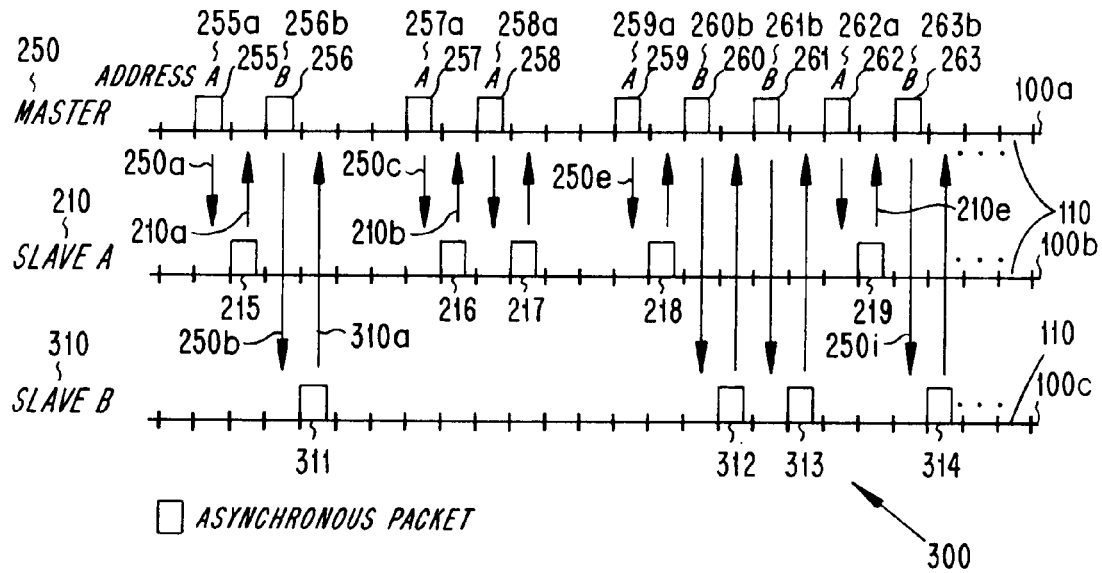
FIG. 3 is a diagram illustrating an exemplary packet-switched connection over slot-based channel in accordance with the present invention.

In the exemplary packet switched embodiment illustrated in FIG. 3, for example, when master 250 transmits data packet A 255 to slave A 210, slave A 210 is configured to listen. After receiving data packet 255, slave A 210 may return data packet 215. Only one slave at a time can return a packet to master 250. A polling scheme may be used to prevent multiple slaves from sending packets to master 250. Such an embodiment may be illustrated in greater detail in FIG. 3 where an exemplary packet-switched connection between master 250 and two slaves, slave A 210 and slave B 310 on communication channel 100 is shown on, for example, link portions 100*a*, 100*b*, and 100*c*. Data packets 255–263 may carry addresses of slave A 210 and slave B 310 accordingly such that each of slave A 210 and slave B 310 knows which of data packets 255–263 is addressed thereto. By further example, master 250 may address data packet 256 to slave B 310 with address B 256*b*. Only the slave addressed in master-to-slave slot 250*b*, slave B 310 in this example, is allowed to respond on the Time-Division duplex link in the following slave-to-master slot 310*a*. It is apparent that in the packet switched example, master 250 may establish multiple asynchronous links over communications channel 100.

Figure 4A:
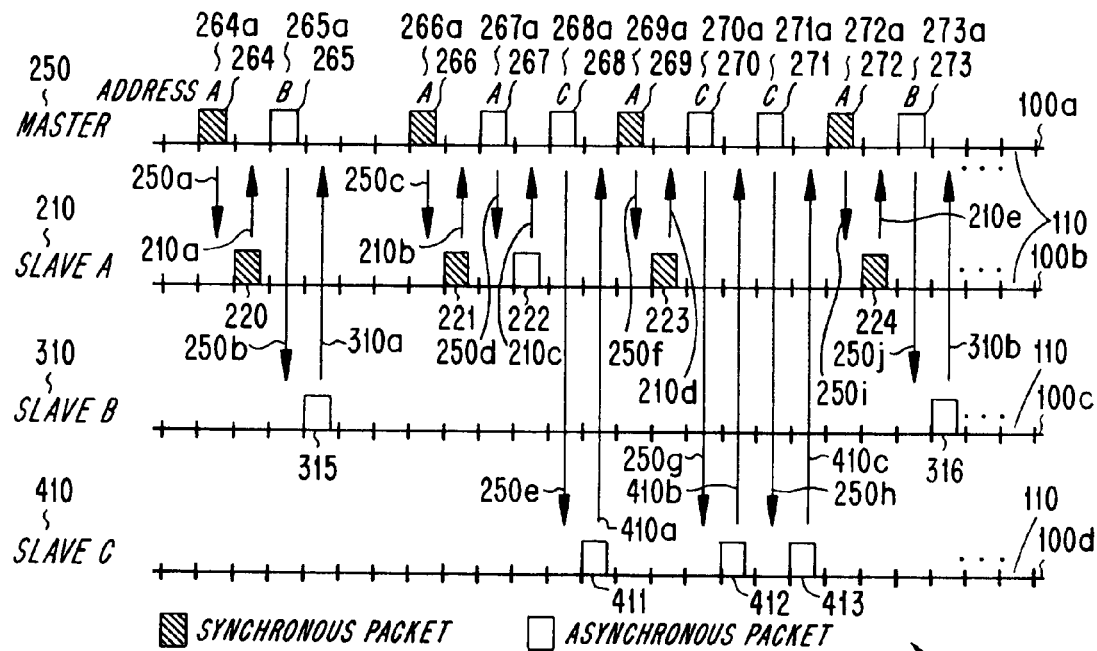
FIG. 4A is a diagram illustrating an exemplary multimedia connection in accordance with the present invention having synchronous and asynchronous links.

In addition to supporting multiple asynchronous links, master 250 may establish, for example, a synchronous link and an asynchronous link on communications channel 100 as illustrated in FIG. 4A, where an exemplary multimedia connection is shown in accordance with the present invention. Slot-based communications channel 100 may supports both circuit-switched links and packet-switched links. Using centralized control including packet addressing as shown, master 250 may support a synchronous duplex link to slave A 210 in a manner as described with reference to FIG. 2A. At the same time, master 250 may support an asynchronous link to all slaves A 210, B 310, and C 410. Although communications over circuit switched links on communication channel 100 take priority over packet switched connections, such communications may be interrupted as described. In such a multimedia embodiment, a synchronous link may be established by master 250, represented by data packets 264, 266, 269, and 272 having, for example, addresses A 264*a*, 266*a*, 269*a*, and 272*a* associated therewith being sent to slave A 210 over a reserved timeslot 110. Additional data packet 267 associated with an asynchronous link may further be sent by master 250 to slave A 210 using address A 267*a* during a different interval but nonetheless while the synchronous link is still set up on communications channel 100. Slave A 210 may reply during a transmit interval with reply data packet 272 following the receive interval during which data packet 267 was received. As described, an asynchronous link may be established additionally with slaves B 310 and C 410. Master 250 may transmit packet 265 and 273, for example, asynchronously to slave B 310 using addresses B 265*a* and B 273*a* during transmit intervals 250*b* and 250*j* respectively. Slave B may respond accordingly with reply data packets 315 and 316 during corresponding transmit intervals 310*a* and 310*b*. Master 250 may also transmit packet 268, 270, and 271 for example, asynchronously to slave C 410 using addresses C 268*a*, C 270*a*, and C 271*a* during transmit intervals 250*e*, 250*g*, and 250*h*, respectively. It should again be noted that although, for example, addresses B 265*a* and B 273*a*, and C 268*a*, C 270*a*, and C 271*a*, for slaves B 310 and slave C 410 respectively, are described using different reference numerals, addresses B 265*a* and address B 273*a*, in the exemplary embodiment are the same address. Slave C may respond accordingly with reply data packets 411, 412, and 413 during corresponding transmit intervals 410a, 410b, and 410c which make up the second half of the Time-Division duplex link described earlier.

Figure 4B:
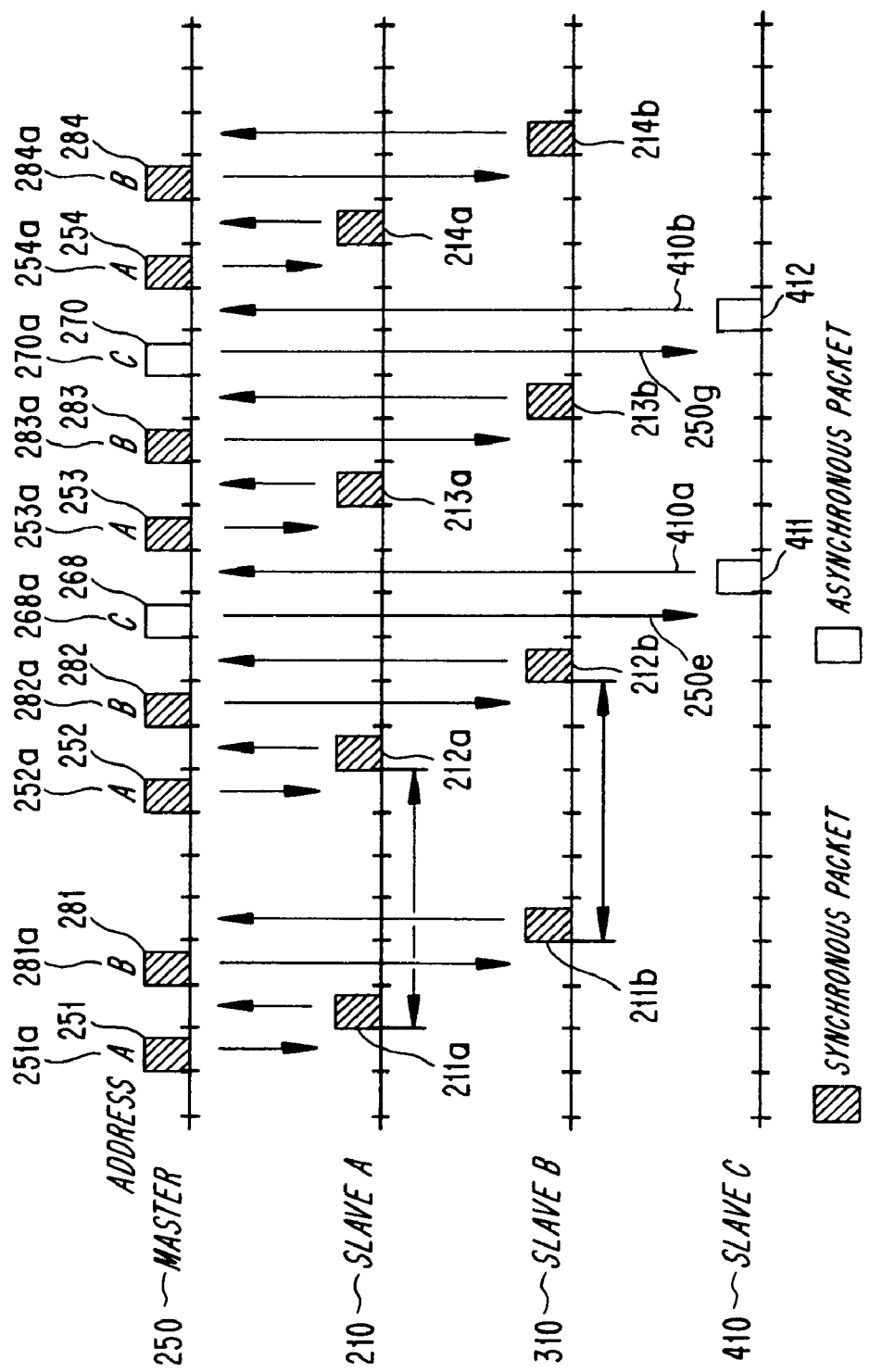
FIG. 4B is a diagram illustrating an exemplary multimedia connection in accordance with the present invention having additional synchronous links.

In accordance with another embodiment of the present invention, as illustrated in FIG. 4B, additional synchronous links may be established between master 250 and one or more additional slave units, for example, slave B 310 in a manner similar to that described with reference to FIG. 2B. In this exemplary embodiment, Master 250 may reserve additional time slots 110 to establish a second synchronous link with, for example, slave B 310 while conducting asynchronous communications with slave C 410 as described above. Data packets 281–284 may be communicated to Slave B 310 using addresses 281a–284a. In response, Slave B 310 may respond alternately with data packets 211b–214b. Preferably, as illustrated, additional synchronous links use the same slot interval T 230 in order to avoid interference. If the interval T 230 is not chosen identical on all links, then periodically, time slots in the sets of two or more links coincide which may lead to collisions. However, again, since such a situation can be predicted, appropriate countermeasures can be taken by master 250 and/or the corresponding slave to prevent information loss. Each additional synchronous link is staggered by an even number of time slots to allow for the return link. Additional time slots 110 not used for synchronous links may be used for asynchronous links such as the asynchronous link with slave C 410. Master 250 may communicate packets 268 and 270, for example, to slave C 410 using addresses 268a and 270a. In response, slave C 410 may respond in subsequent timeslots with response packets 411 and 412 on duplex link portions 410a and 410b as previously described. Any established synchronous links may be interrupted in the manner previously described.

Accordingly, both packet and circuit switched links may be established on communications channel 100 even between the same units, for example, master 250 and slave A 210 as described. In a multimedia communications environment, such an advantage is apparent in facilitating, for example, real time voice and packet data communications on the same channel between the same devices where typically only one type of connection (e.g. circuit switched or packet switched) would be supported. Other advantages will become apparent to one skilled in the art using the teachings of the present invention, for example, no extra bandwidth for emergency break in is required.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method for establishing a link on a shared communications channel divided into a plurality of time slots, the method comprising the steps of:

establishing a synchronous communications link between a first and second communication unit;

communicating a first data packet on a first one of a set of time slots associated with the synchronous communication link from the first communication unit to the second communication unit by including an address associated with the second communication unit in the first data packet;

establishing an asynchronous communications link between the first communication unit and one or more additional communication units including the second communication unit using one or more remaining ones of the plurality of time slots; and communicating a second data packet on a first of the one or more of the remaining time slots associated with the asynchronous communications link from the first communication unit to the second communication unit by including another address associated with the second communication unit.

2. The method of claim 1, wherein the step of establishing the synchronous communications link further includes the steps of:

reserving a set of the plurality of time slots for use by the synchronous communications link;

separating each one of the time slots associated with the set by a fixed time interval.

3. The method of claim 1, further including the step of interrupting the synchronous communications link with the asynchronous communications link by communicating the second data packet from the first communication unit to the second communication unit on a second one of the set of time slots associated with the synchronous communications link.

4. The method of claim 1, wherein the asynchronous link further includes a Time-Division duplex link and wherein the first communication unit alternately transmits and receives on different ones of the remaining time slots.

5. The method of claim 1, further including the steps of:

communicating the second data packet on one or more additional ones of the remaining one or more time slots from the first communication unit to the one or more additional units; and polling each of the one or more additional units for a response packet to the second data packet.

6. The method of claim 5, wherein the asynchronous link further includes a Time-Division duplex link and wherein the one or more additional units alternately receive the poll from the first communication unit and transmit the response packet on different ones of the remaining time slots.

7. The method of claim 1, further comprising the steps of:

establishing a second synchronous communications link between a first and third communication unit; and communicating a second data packet on a first one of a set of time slots associated with the second synchronous communication link from the first communication unit to the third communication unit by including an address associated with the third communication unit in the second data packet.

8. The method of claim 7, further including the step of interrupting the second synchronous communications link with an asynchronous communications link by communicating the second data packet from the first communication unit to the third communication unit on a second one of the set of time slots associated with the second synchronous communications link.

9. The method of claim 1, wherein the plurality of time slots associated with the shared communications channel are further divided into a plurality of frequencies.

10. The method of claim 9, wherein the step of communicating further includes the step of communicating subsequent data packets on subsequent ones of the set of time slots associated with the synchronous communication link from the first communication unit to the second communication unit using different ones of the plurality of frequencies.

11. The method of claim 1, wherein the synchronous communications link between the first and second communication units operates in accordance with a frameless protocol.

12. The method of claim 1, wherein the address and the another address associated with the second communication unit use the same address.

13. A communication system for establishing multimedia communications on a shared communications channel comprising:
  a first communication unit; and
  one or more additional communication units including a second communication unit coupled to the first communication unit by the shared communications channel, wherein the first unit:
  establishes a synchronous communications link with the second communication unit, said synchronous link having a set of time slots associated therewith;
  communicates a first data packet on a first of the set of time slots associated with the synchronous communication link to the second communication unit by including an address associated with the second communication unit in the data packet;
  establishes an asynchronous communications link between the first communication unit and the one or more additional communication units using one or more remaining ones of the plurality of time slots; and
  communicates a second data packet on a first of the one or more of the remaining time slots associated with the asynchronous communications link from the first communication unit to the one or more additional communication units by including one or more addresses associated with each of the one or more additional communication units.

14. The communication system of claim 13, wherein the first communication unit:
  reserves the set of the plurality of time slots for use by the synchronous communications link; and
  separates each one of the time slots associated with the set by a fixed time Interval.

15. The communication system of claim 13, wherein the first communication unit interrupts the synchronous communications link with the asynchronous communications link by communicating the second data packet from the first communication unit to the second communication unit on a second one of the set of time slots reserved for the synchronous communications link.

16. The communication system of claim 13, wherein the asynchronous link further includes a Time-Division duplex link and wherein the first communication unit alternately transmits and receives on different ones of the remaining time slots.

17. The communication system of claim 13, wherein the first communication unit:
  communicates the second data packet on one or more additional ones of the remaining one or more time slots from the first communication unit to the one or more additional units; and
  polls each of the one or more additional units for a response packet to the second data packet.

18. The communication system of claim 17, wherein the asynchronous link further includes a Time-Division duplex link and wherein the one or more additional units alternately receive the poll from the first communication unit and transmit the response packet on different ones of the remaining time slots.

19. The communication system of claim 13, further comprising a third communication unit;
  wherein the first communication unit:
  establishes a second synchronous communications link with the third communication unit, said second synchronous link having a set of time slots associated therewith; and
  communicates a first data packet on a first of the set of time slots associated with the synchronous communication link to the second communication unit by including an address associated with the second communication unit in the data packet.

20. The communication system of claim 13, wherein the plurality of time slots associated with the shared communications channel are further divided into a plurality of frequencies.

21. The communication system of claim 20, wherein the first communication unit communicates subsequent data packets on subsequent ones of the set of time slots associated with the synchronous communication link from the first communication unit to the second communication unit using different ones of the plurality of frequencies.

22. The communication system of claim 13, wherein the synchronous communication link operates in accordance with a frameless protocol.

23. A master communication unit in a communication system having a shared communications channel divided into a plurality of timeslots, the master communication unit comprising:
  a transceiver for transmitting and receiving data packets over said shared communication channel; and
  a processor coupled to the transceiver, the processor reserves one or more sets of the plurality of timeslots to establish one or more synchronous communications links thereupon;
  establishes one or more asynchronous communications links on the remaining ones of the plurality of timeslots; and
  causes said transceiver to use one or more destination addresses when transmitting data packets over said communications channel on said one or more synchronous communications links and said one or more asynchronous communications links,
  wherein the processor causes said transceiver to include within the data packets an address associated with a slave communication unit when communicating with the slave communication unit on one of said one or more synchronous communications links, and causes said transceiver to include within the data packets another address associated with the slave communication unit when communicating with the slave communication unit on one of said one or more synchronous communications links.

24. The master communication unit of claim 23, wherein the processor:
  interrupts the one or more synchronous communication links by causing the transceiver to transmit one or more asynchronous data packets to one or more destinations specified by one or more of the one or more destination addresses.

25. The master communication unit of claim 23, wherein the one or more synchronous and the one or more asynchronous communications link further comprise Time Division Duplex links.

26. The master communication unit of claim 23, wherein the one or more synchronous communications links and the one or more asynchronous communications links operate in accordance with a frameless protocol.

* * * * *

UNITED STATES PATENT AND TRADEMARK OFFICE
CERTIFICATE OF CORRECTION

PATENT NO. : 6,973,067 B1 Page 1 of 1
APPLICATION NO. : 09/348495
DATED : December 6, 2005
INVENTOR(S) : Jacobus Cornelis Haartsen It is certified that error appears in the above-identified patent and that said Letters Patent is hereby corrected as shown below:

Col. 11, Claim 14, Line 6: Please change "Interval." to --interval.--

Col. 12, Claim 23, Line 27: Please change "synchronous" to --asynchronous--

Signed and Sealed this

Eleventh Day of December, 2007

JON W. DUDAS
*Director of the United States Patent and Trademark Office*